(12) United States Patent
Rinkel et al.

(10) Patent No.: US 9,689,994 B2
(45) Date of Patent: Jun. 27, 2017

(54) METHOD FOR CORRECTING THE STACKING PHENOMENON APPLIED TO X-RAY SPECTRUMS ACQUIRED USING A SPECTROMETRIC SENSOR

(75) Inventors: Jean Rinkel, Grenoble (FR); Andrea Brambilla, Veurey-Voroize (FR); Jean-Marc Dinten, Lyons (FR); Florent Mougel, Civrieux (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 1205 days.

(21) Appl. No.: 13/512,485

(22) PCT Filed: Nov. 30, 2010

(86) PCT No.: PCT/EP2010/068497
§ 371 (c)(1),
(2), (4) Date: Aug. 6, 2012

(87) PCT Pub. No.: WO2011/064381
PCT Pub. Date: Jun. 3, 2011

(65) Prior Publication Data
US 2013/0046500 A1    Feb. 21, 2013

(30) Foreign Application Priority Data
Nov. 30, 2009   (FR) ...................................... 09 58522

(51) Int. Cl.
*G01C 19/00*     (2013.01)
*G01T 1/17*     (2006.01)

(52) U.S. Cl.
CPC .................................. *G01T 1/171* (2013.01)

(58) Field of Classification Search
None
See application file for complete search history.

(56) References Cited

U.S. PATENT DOCUMENTS

| 5,206,174 A | 4/1993 | Gehrke et al. |
| 5,821,538 A | 10/1998 | De Antoni et al. |

(Continued)

FOREIGN PATENT DOCUMENTS

| CN | 101566591 A | 10/2009 |
| CN | 101566591 A | 10/2009 |

(Continued)

OTHER PUBLICATIONS

Japanese Office Action issued Nov. 4, 2014 in Patent Application No. 2012-541458 (with English language translation).

(Continued)

*Primary Examiner* — Aditya Bhat
(74) *Attorney, Agent, or Firm* — Oblon, McClelland, Maier & Neustadt, L.L.P.

(57) ABSTRACT

A method correcting a measured spectrum of X radiation, according to a number of channels Nc, each channel i corresponding to an energy range between $E_i$ and $E_i+\Delta E_i$, including: determining function $\delta t_{i,j}(k)$ determining size of temporal deviation $\Delta t$ interval separating two interactions with energy $E_i$ and $E_j$, stacking of which leads to a detected energy value $E_k$; determining, from the function $\delta t_{i,j}(k)$, probability function $P_{i,j}(k)$ that an event counted in a channel k corresponds to a stack of two interactions, respectively of energies $E_i$ and $E_j$; determining, from the probability function $P_{i,j}(k)$, a stack spectrum as a part of the measured spectrum that corresponds only to the stacks alone; and calculating or estimating at least a first corrected spectrum, by the difference between the measured spectrum and the stack spectrum.

23 Claims, 6 Drawing Sheets

(56) References Cited

U.S. PATENT DOCUMENTS

| | | |
|---|---|---|
| 2008/0025385 A1 | 1/2008 | Barat et al. |
| 2009/0152448 A1 | 6/2009 | Ouvrier-Buffet et al. |
| 2011/0098980 A1 | 4/2011 | Ouvrier-Buffet et al. |

FOREIGN PATENT DOCUMENTS

| | | |
|---|---|---|
| EP | 2 071 722 A1 | 6/2009 |
| FR | 2 738 693 A1 | 3/1997 |
| FR | 2 870 603 A1 | 11/2005 |

OTHER PUBLICATIONS

Chinese Office Action issued Dec. 24, 2014 in Patent Application No. 201080061692.0 (with English language translation).

Thomas Trigano, "Traitement statistique du signal spectrométrique: étude du désempilement de spectre en énergie pour la spectrométrie Gamma", LTCI—Télécom ParisTech, Version 1, Jul. 11, 2006, 179 pages (with English abstract).

International Search Report issued Apr. 19, 2011 in PCT/EP2010/068497.

Robin P. Gardner et al., "A Generalized Method for Correcting Pulse-Height Spectra for the Peak Pile-up Effect due to Double Sum Pulses—Part I: Predicting Spectral Distortion for Arbitrary Pulse Shapes", Nuclear Instruments and Methods, vol. 140, No. 2, XP-002595352, Jan. 15, 1977, pp. 289-296.

Lucian Wielopolski et al., "A Generalized Method for Correcting Pulse-Height Spectra for the Peak Pile-up Effect due to Double Sum Pulses—Part II: The inverse calculation for Obtaining true from Observed Spectra", Nuclear Instruments and Methods, vol. 140, No. 2, XP-002595351, Jan. 15, 1977, pp. 297-303.

N. P. Barradas et al., "Accurate Calculation of Pileup Effects in PIXE Spectra from first Principles", X-Ray Spectrometry, vol. 35, XP-007914254, Jan. 1, 2006, pp. 232-237.

Fred H. Tenney, "Idealized Pulse Pileup Effects on Energy Spectra", Nuclear Instruments & Methods in Physics Research, vol. 219, No. 1, XP-002595353, Jan. 1, 1984, pp. 165-172.

Preliminary French Search Report Issued Aug. 27, 2010 in Patent Application No. 0958522 (with English translation of Categories of Cited Documents).

"American National Standard for Calibration and Use of Germanium Spectrometers for the Measurement of Gamma-Ray Emission Rates of Radionuclides", American National Standards Institutes, ANSI N42 (14), 1999, pp. 1-76 with cover pages.

Lucian Wielopolski et al., "Prediction of the Pulse-Height Spectral Distortion Caused by the Peak Pile-Up Effect", Nuclear Instruments and Methods, vol. 133, 1976, pp. 303-309.

Combined Chinese Office Action and Search Report issued Feb. 13, 2014 in Patent Application No. 201080061692.0 (with English language translation).

METHOD FOR CORRECTING THE STACKING PHENOMENON APPLIED TO X-RAY SPECTRUMS ACQUIRED USING A SPECTROMETRIC SENSOR

TECHNICAL FIELD AND BACKGROUND OF THE INVENTION

The invention concerns the field of high flow spectrometry using x-rays and gamma rays.

The applications of high flow spectrometry are varied.

Applications include the use of gamma probes in radiation protection, multi-energy imaging in the medical field (e.g. bi-energy scanners), in the field of non-destructive testing and in security applications (e.g. detection of explosive materials using multi-energy radiography).

One particular industrial application of the invention is the detection of explosives for examining baggage using moving radiographs. But other applications are possible, in particular during measurements of intense X and/or gamma photonic flows using spectrometry, for example in measuring waste or nuclear fuels.

Moreover, it is difficult to make the known techniques compatible with the current baggage inspection requirements: a method is needed that is fast, but also precise and compatible with security. In particular, the movement speed of the baggage requires that a measurement be done of the energy of the photons transmitted through the baggage, over a short time (several ms) with a high incident photon flow (several tens of Mphotons/mm$^2$/s) to keep sufficient statistics.

The spectrometric sensors concerned by the invention are preferably direct conversion sensors, i.e. the incident X photons on the sensor interact with a polarized semiconductor material (CdTe for example), and create a cloud of electronic charges (typically 10000 electrons for an X photon of 60 keV).

These charges are then collected by electrodes and form a transient electrical signal called a pulse. If the collection is complete, the entire measured pulse is proportionate to the energy deposited by the incident particle.

An electronic circuit makes it possible to measure this integral.

After digitization, the pulses are classified in different channels depending on their amplitude, and an energy value is assigned to each channel. The distribution by channels of each interaction corresponds to the energy spectrum of the radiation having interacted with the irradiated object, or energy spectrum of the detected radiation. The radiation is preferably an X or gamma photon radiation.

In the case of baggage inspection, such a spectrum makes it possible to provide information on the density and nature of said object.

In spectrometry systems, comprising a sensor connected to electronic circuits for amplifying and processing the detected signal, the problem arises of correcting degradation effects related to the high flows of photons on the measured spectrums (as indicated above, high flows are indeed necessary during baggage inspections).

More specifically, it involves the poor separability, or stacking, phenomenon of interactions detected by the detector at very close moments. The more intense the incident photon flow at the detector, the higher the interaction rate (number of interactions occurring in the detector per unit of time). First, the counting rate measured by the detector, corresponding to the number of interactions detected per unit of time, increases with the interaction rate, and the probability of obtaining a stack also increases. Then, when the incident photon flow becomes too significant, the counting rate practically does not increase any more, and can even decrease, due to the saturation of the detector.

The notion of strong flow corresponds to typical flow values between $1 \times 10^4$ and $10^9$ interactions per second and per pixel (or elementary detector). In the case of X ray with energy in the vicinity of 100 keV, the number of interactions per second is relatively close to the number of incident photons per second, in other words the incident photon flow, the probability of interaction of such photons being high.

One important parameter is the counting rate measured by the detector previously defined. When the flow of photons to which the detector is subjected is not too high, the interaction rate in the detector is substantially equal to the counting rate measured by the detector, the latter corresponding to the number of events (or number of counts) appearing in the spectrum per unit of time.

In the case of an intense flow of radiation, in general, beyond a given counting rate, a saturation of the detector and the signal processing electronics occurs.

The measured counting rate then no longer corresponds to the flow to which the detector is subjected.

One consequence of this saturation is a strong degradation of the energy resolution of the spectrum and the detection efficacy.

Figure 9:
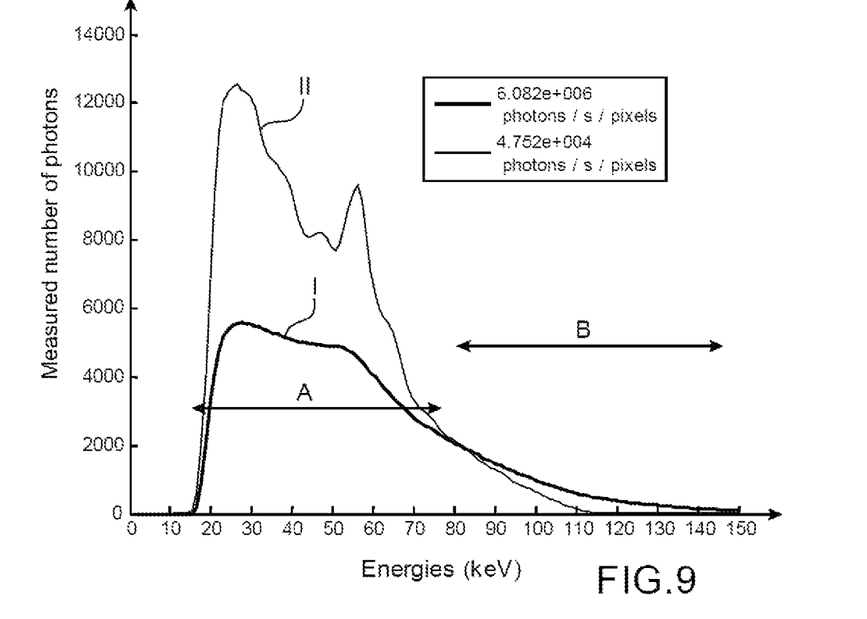
FIG. 9 is a spectrum measurement at two different flows, which illustrates the problems posed by the stacking phenomenon.

FIG. 9 is a spectrum measurement at two different flows, which illustrates the problems posed by the stacking phenomenon.

Curve I corresponds to an incident flow of $6,082 \times 10^6$ photons/s/detector while curve II corresponds to an incident flow of $4,752 \times 10^4$ photons/s/detector.

When the flow increases (number of incident X photons per unit of time per pixel), the supplied signal deteriorates due to the stacking phenomenon: if two events are detected with too short a time lapse separating them, the system is not able to tell them apart and provides an erroneous signal depending on the energies of the two photons and the time interval separating them.

In FIG. 9, two effects resulting from the stacking phenomenon can be seen on curves I and II:

a decrease in the counting rate measured when the flow increases, visible at low energies (zone A in FIG. 9);

an increase in the number of events counted at high energies with the flow due to the spectrum of stacks (zone B in FIG. 9).

This stacking phenomenon is well known. Different method classes exist making it possible to deal with the stacking phenomenon.

Empirical methods are known: one approach is based on calibrating the stacking phenomenon with radioactive sources having known activity.

The information resulting from the calibration is then used on the unknown signal, as described in American National Standard for Calibration and Use of Germanium Spectrometers for the Measurement of Gamma-Ray Emission Rates of Radionuclides, American National Standards Institute (ANSI) N42.14-1999, p. 7, 13, 15, 86, 89, 134.

The main drawback of this approach is the need to have γ-ray emitting sources with strong activity, which makes the calibration method complex and in particular poses radiation protection problems.

Also known are analog methods, which optimize the electronics to minimize the stacks. In particular the use of inhibitor circuits makes it possible not to take into account the new particles absorbed before the end of the processing of the current particle.

This type of approach makes it possible to obtain a non-paralyzable system, the drawback being that the dead time resulting from the processing decreases the counting rate performance of such a system.

Digital methods also exist, called live time correction methods, that make it possible to reject part of the stacks. But this method causes an increase in the time to acquire a spectrum.

According to other solutions, certain signal processing parameters are adjusted, in particular concerning the shaping of the impulses. But, aside from degradation of the resolution, these solutions are not very efficient: they only slightly push back the boundary of the interaction rate from which the measuring system is no longer exploitable.

Lastly, there are a posteriori correction methods, in particular that from document FR 2 870 603, or described in Trigano, T., Traitement du signal spectrométrique: <<Etude du désempilement de spectre en énergie pour la spectrométrie gamma>>, 2006.

This method is based on knowledge of the duration and energy of each pulse, which is a limitation on said method, in particular at high counting rates.

BRIEF DESCRIPTION OF THE INVENTION

A method according to the invention makes it possible to estimate, from a spectrum acquired using a spectrometric chain, a corrected spectrum of the degradation related to the stacks.

The invention concerns a method for correcting a measured spectrum of X radiation ($Sp_{mes}$), including:
 determining a stack spectrum (Emp), which is the part of the measured spectrum ($Sp_{mes}$), that corresponds only to the stacks alone,
 calculating or estimating at least a first corrected spectrum ($Sp_{cor}$), by the difference between the measured spectrum ($Sp_{mes}$) and the stack spectrum (Emp).

The invention concerns in particular a method for correcting a measured spectrum of X radiation ($Sp_{mes}$), according to a number of channels Nc, each channel i corresponding to an energy range between $E_i$ and $Ei+\Delta E_i$, including:
 determining or calculating the function $\delta t_{i,j}(k)$ determining the size of the temporal deviation $\Delta t$ interval separating two interactions with energy $E_i$ and $E_j$, the stacking of which leads to a detected energy value $E_k$,
 determining or calculating, from said function $\delta t_{i,j}(k)$, the probability function $P_{i,j}(k)$ that an event counted in a channel k corresponds to a stack of two interactions, respectively of energies $E_i$ and $E_j$,
 determining, from said probability function $P_{i,j}(k)$, a stack spectrum (Emp), which is the part of the measured spectrum ($Sp_{mes}$), that corresponds only to the stacks alone,
 calculating or estimating at least a first corrected spectrum ($Sp_{cor}$), by the difference between the measured spectrum ($Sp_{mes}$) and the stack spectrum (Emp).

The stack spectrum can itself be calculated from the measured spectrum ($Sp_{mes}$) and exposure time ($T_{expo}$) and dead time ($T_{dead}$) data of the system, which is the minimum duration separating two photons, below which only one of the two photons is detected due to a stacking of those two photons.

A method according to the invention therefore uses only the data for the measured spectrum and the exposure time and dead time data for the system.

The dead time ($T_{dead}$) can be determined by simulation or experimentally.

A method according to the invention can include the calculation of $N_{it}$ ($N_{it} \geq 1$) corrected spectrums ($Sp_{cor(n)}$) from the corrected spectrum of order $Sp_{cor(n-1)}$, or from the measured spectrum if there is no preceding corrected spectrum, by difference between the latter and the stack spectrum (Emp).

A method according to the invention can in particular be implemented iteratively.

Thus, according to one embodiment, starting from a measured spectrum of an incident radiation having interacted with a sensor, a corrected spectrum is determined according to an iterative method including:
 a step for calculating or estimating a stack spectrum Emp, representing part of the preceding corrected spectrum $Sp_{cor(n-1)}$ (i.e. established during the preceding iteration) that corresponds to stacks;
 a step for correcting the preceding corrected spectrum, using the stack spectrum Emp calculated or estimated during the preceding step, to obtain a new corrected spectrum $Sp_{cor(n)}$;
 replacing the preceding corrected spectrum $Sp_{cor(n-1)}$ with the new corrected spectrum $Sp_{cor(n)}$, potentially to restart an iteration with said new corrected spectrum.

According to one particular embodiment, a method according to the invention includes the following steps, iterated $N_{it}$ times, with $N_{it} \geq 1$, with $1 \leq n \leq N_{it}$:
 the stacking probability is calculated, as a function of the preceding corrected spectrum $Sp_{cor(n-1)}$, or of the measured spectrum if there is no preceding corrected spectrum, and exposure time ($T_{expo}$) and dead time ($T_{dead}$) data,
 a stack spectrum (Emp) is estimated, as a function of the preceding corrected spectrum, or of the measured spectrum if there is no preceding corrected spectrum, and exposure time ($T_{expo}$) and dead time ($T_{dead}$) data,
 a corrected spectrum is calculated, by the difference between the measured spectrum ($Sp_{mes}$) and the estimated stack spectrum (Emp).

The invention also concerns a device for correcting a measured X radiation spectrum, including:
 means for determining a stack spectrum (Emp), which is the part of the measured spectrum ($Sp_{mes}$) that corresponds only to the stacks,
 means for calculating at least a first corrected spectrum ($Sp_{cor}$), by the difference between the measured spectrum ($Sp_{mes}$) and the stack spectrum (Emp).

The invention concerns in particular a device for correcting a measured X radiation spectrum, comprising a number of channels Nc, each channel i corresponding to an energy range between $E_i$ and $Ei+\Delta E_i$, including:
 means for determining or calculating a function $\delta t_{i,j}(k)$ determining the size of the temporal deviation $\Delta t$ interval separating two interactions with energy $E_i$ and $E_j$, the stacking of which leads to a detected energy value $E_k$,
 means for determining or calculating, from said function $\delta t_{i,j}(k)$, the probability function $P_{i,j}(k)$ that an event counted in a channel k corresponds to a stack of two interactions, respectively of energies $E_i$ and $E_j$,
 means for determining a stack spectrum (Emp), which is the part of the measured spectrum ($Sp_{mes}$) that corresponds only to the stacks alone,
 means for calculating at least a first corrected spectrum ($Sp_{cor}$), using the difference between the measured spectrum ($Sp_{mes}$) and the stack spectrum (Emp).

The stack spectrum can be calculated from the measured spectrum ($Sp_{mes}$) and exposure time ($T_{expo}$) and dead time ($T_{dead}$) data of the system, minimal duration, separating two photons, below which only one of the two photons is detected.

Such a device can include means for determining the dead time by simulation.

A device according to the invention preferably includes means for determining a corrected spectrum according to an iterative method including the steps already described above.

In a method or a device according to the invention, the stacking probability can advantageously be calculated using the formula:

$$P = 1 - \left(1 - 2 \times \frac{T_{dead}}{T_{expo}}\right)^{\sum_{j=1}^{Nmax} Sp_{cor(n-1)}(j)-1}$$

or using the approximation formula $$P = 1 - \left(1 - 2 \times \frac{T_{dead}}{T_{expo}}\right)^{\sum_{j=1}^{Nmax} Sp_{cor(n-1)}(j)}$$

where $SP_{cor(n-1)}(j)$ is the value, for the channel j, of the preceding corrected spectrum $SP_{cor(n-1)}$, or of the measured spectrum if there is no preceding corrected spectrum.

The stack spectrum can be calculated using the formula:

$$Emp(k) = \sum_{i=1}^{Nc} \sum_{j=i}^{Nc} P_{i,j}(k)$$

In said formula, one can have:

$$P_{i,j}(k) = 1 - [1 - 2 \times \delta t_{i,j}(k)/T_{expo}]^{Sp_{cor(n-1)}(E_i) \times Sp_{cor(n-1)}(E_j)}$$

Where $\delta t_{i,j}(k)$ is determined from the inverse function of the stacking function $F^{-1}_{EiEj}$, the stacking function associating $F_{EiEj}$, with a pair of photons with energies ($E_i$, $E_j$), the energy measured as a function of the shift $\Delta t$ between the arrival moments of the two photons. The function $\delta t_{i,j}(k)$ determines the size of the temporal deviation interval $\Delta t$ separating two interactions of energy $E_i$ and $E_j$, the stacking of which leads to a detected energy value $E_k$. The stacking function $F_{EiEj}$ can be obtained experimentally or by simulation, for example it is estimated by a decreasing affine function of the energy.

The invention also concerns a spectrometry device, including:
a radiation sensor,
electronic means for processing signals coming from the sensor and to form a spectrum of a radiation having interacted with the sensor,
a device for correcting a measured X radiation spectrum according to the invention, as described above.

According to the invention, the stacks are not limited by a modification of the processing circuit of the signal, but by a processing of the measured energy spectrum.

According to one embodiment, $\delta t_{i,j}(k)$ is independent of k, and is equal, regardless of k, to $$\delta t_{i,j}(k) = \partial t_{ij} = \frac{E_{k+1} - E_k}{(E_i + E_j - \max(E_i, E_j))/T_{dead}}$$

DETAILED DESCRIPTION OF THE INVENTION

One example of an embodiment of a device according to the invention will be given, in connection with FIG. 1.

This device, a spectrometry chain 1, includes the following elements:
a radiation source 1,
a sensor 2, for example made from CdTe; this sensor is for example provided with two electrodes, at the terminals of which a signal results from an interaction of a radiation or a photon with the material of the sensor,
a charge preamplifier 4,
an amplifier 6,
an Analog/Digital converter 8,
a means 10 for performing processing of the signal that has been shaped and digitized by the means 4, 6, 8, and to form a spectrum of a radiation according to a number of channels Nc, each channel i corresponding to an energy range between $E_i$ and $Ei+\Delta E_i$, $\Delta Ei$ ($\Delta Ei \neq 0$) then corresponding to the energy width of the channel i. $\Delta Ei$ can be identical for each channel, such that for any channel i, $\Delta Ei = \Delta E$, $\Delta E$ then being a constant.
a means 12 for performing processing of the spectrums following a method according to the invention.

Other processing means, for example based on delay line circuits, in particular making it possible to shape the signal, can be provided upstream of the analog digital converter.

During a use of the device, a sample of material 100 is arranged between the source and the detector in order to be characterized.

The means 12 in particular includes a computer or a microcomputer or a calculator programmed to store and process spectrum data and data to implement a method according to the invention, for example the data $T_{expo}$ and $T_{dead}$.

Figure 5:
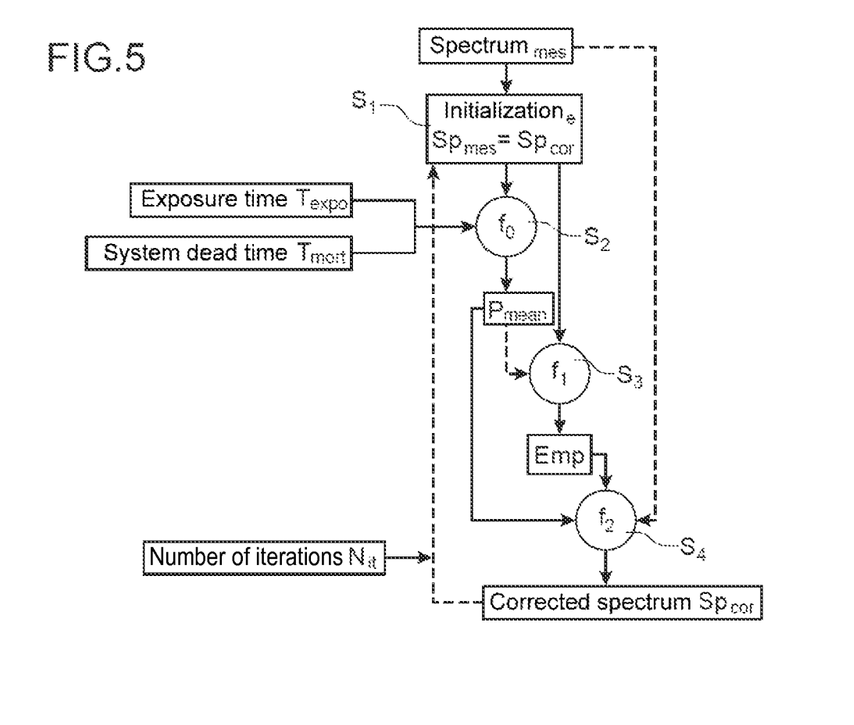
FIG. 5 shows the performance of an iterative method according to the invention.

More precisely, a central processing unit 16 is programmed to carry out a processing method according to the invention, by calculating a stack spectrum, for example using an iterative method as described below in relation to FIG. 5, and by calculating or estimating a corrected spectrum ($Sp_{cor}$) using the difference between stored measured spectrum data ($Sp_{mes}$) and stored stack spectrum data (Emp). It should be noted that all or part of the processing method according to the invention could be implemented by the means 10, this means being able to be a FPGA (Field Programmable Gate Array) or an ASIC (Application Specific Integrated Circuit).

This means 12 can make it possible to control the X radiation source 1, to trigger a radiation emission and perform one or several measurements using the detector 2. This electronic means 12 can make it possible to perform a synchronous control of the triggering of the radiation source(s) and the detector(s).

This means 12 can also make it possible to conduct an estimate of the dead time $T_{dead}$ and the stacking function $F_{EiEj}$, or from its inverse $F^{-1}$, experimentally or by modeling, as explained below.

Using the means 12, an operator can select one or several parameters to carry out these operations. The operator can in particular select a number of iterations $N_{it}$ to carry out an iterative process according to the invention, or order the stop of the iterations. The iterations can also stop automatically according to a convergence criterion.

On the monitor or the display means 17, it is possible to display a measured spectrum $Sp_{mes}$ as well as a corrected spectrum $Sp_{cor}$ according to the present invention, and possibly a stack spectrum Emp.

An operator can choose, for example using a pull-down menu, a number of iterations to be performed for processing according to the invention.

Such a device can also implement a delay line making it possible to shape the pulses in a trapezium, for example as described in EP 2071722. This device, illustrated in FIG. 10, primarily includes:
- a charge preamplification circuit 20 of the integrator type, able to be connected to the semiconductor detector 2 (the resistor 14 designates a polarization resistance associated with the detector 2),
- a delay line circuit 22 for measuring energy (including a delay line 32, a first gain 34, a subtractor 36 and a second gain 38), connected at the outlet of the preamplification circuit, and
- a sampler connected at the outlet of the energy measurement circuit.

Figure 10:
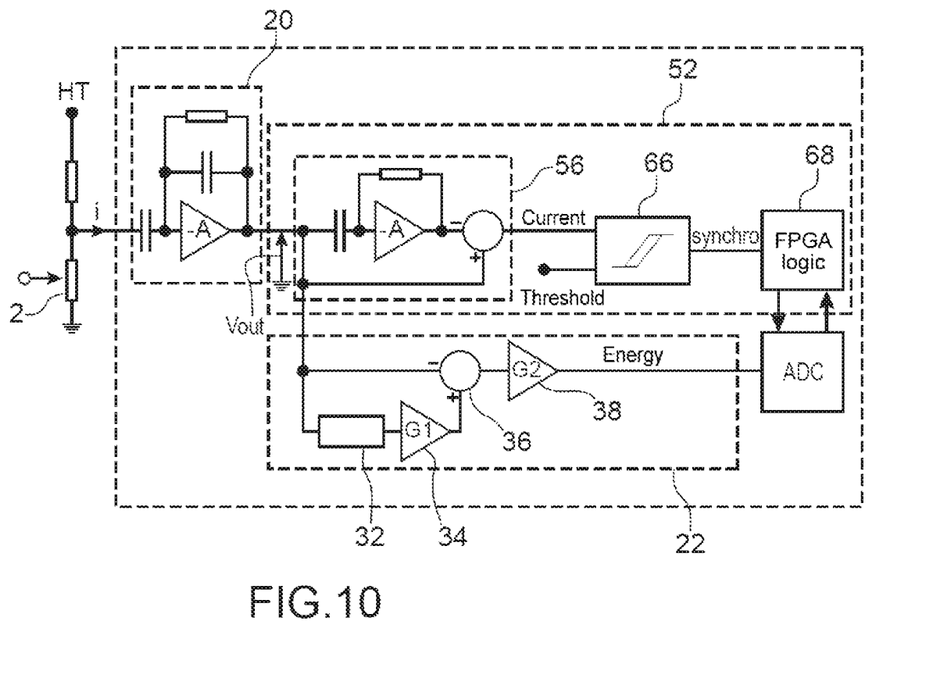
FIG. 10 presents a spectrometry device, with delay line.

It also includes a synchronization circuit 52 comprising:
- a current pulse measuring circuit 56, connected at the outlet of the preamplification circuit 20 and making the difference between the output and a derivative of the output signal of the preamplification circuit, and
- a discrimination circuit 66 forming a binary signal as a function of the output signal of the pulse measuring circuit 22, said logic signal controlling the sampling moments of the sampler.

Means such as the means 12 described above can be combined with this circuit to produce a device implementing a method according to the invention.

Other aspects of this circuit are described in document EP 2071722.

In other words, the signal is shaped, then digitized by an analog digital converter (ADC), then classified in the form of a spectrum by a programmable electronic circuit of the FPGA type. The passage of the shaped signal (so-called trapezium, or temporal, signal) and digitized via the ADC to the spectrum is done in the FPGA.

From an incident X radiation 20 with a spectrum $Sp_0$, a spectrum $Sp_{mes}$ is measured using the sensor 2 and a processing means 4-12. Let $T_{expo}$ be the exposure time, i.e. the time used or measuring time, or acquisition time, during which the energy spectrum is produced from the incident flow at the detector.

$Sp_{mes}$ is for example one of the spectrums that were commented on above in relation to FIG. 9.

As already explained above, such a spectrum includes perturbations that come from photon stacking phenomena.

$Sp_0(E)$ designates the number of photons of the incident radiation 20 at a certain energy E.

Let $P_{mean}$ be the probability for each photon of stacking with at least one other photon. The measured spectrum $Sp_{mes}$ at energy E can then be deduced from the incident spectrum $Sp_0$ by the following equality:

$Sp_{mes}(E)=Sp_0(E)\times(1-P_{mean})+Emp(E)$

The factor $(1-P_{mean})\times Sp_0(E)$ represents the group of photons that have not undergone stacking.

The term Emp(E) is the contribution to the measurement, at energy E, of all of the photons of the spectrum $Sp_0$ that are stacked (this is the "stack spectrum"). Emp(E) depends on the incident spectrum $Sp_0$ and the behavior of the system formed by the sensor 2 and by the electronic means 4-10 with regard to the photons detected at very close times, i.e. in a stacking situation.

The dead time $T_{dead}$ is defined: it is the minimum duration, separating two interactions (two events), below which only one out of two events is detected.

For two incident photons on the sensor, during the duration $T_{expo}$, there is stacking if the interaction moment $t_1$ of a photon in the sensor 2 is separated, temporally, from the interaction moment $t_2$ of the other photon, in the sensor 2, by a duration shorter than $T_{dead}$ r in other words if $|t_2-t_1| \leq T_{dead}$.

When arrival of the photons in the detector 2 is assumed to be equiprobable during the duration $T_{expo}$, the stacking probability of those two incident photons is:

$P_0 = 2 \times T_{dead}/T_{expo}$

Conversely:
- the probability for an incident photon of not stacking with another photon is $1-P0$;
- the probability for that same incident photon of not stacking with any photon is equal to the product of the probabilities of the different events, because they are independent events.

The stacking probability P of an incident photon with at least one other photon is therefore equal to:

$P_{mean}=1-(1-P_0)^{N-1}$

Where N represents the number of photons in the incident spectrum:

$$N = \sum_E Sp_0(E).$$

Hereinafter, the energies being discretized, $E_i$ denotes the energy range of the photons detected in the absence of stacks in the $i^{th}$ channel of the spectrometric sensor.

In order to estimate the stack spectrum, one starts from the approximation according to which all of the stacks concern exactly two photons.

The boundaries of this approximation are studied and discussed later.

When two photons are absorbed by the sensor in a stacking situation, only one event is counted.

Figure 2:
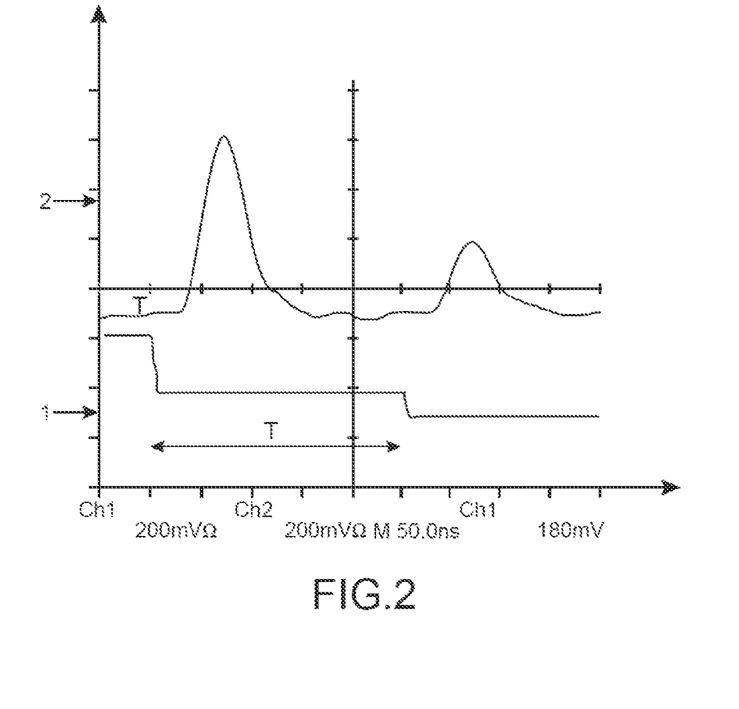
FIG. 2 shows measurements done on an experimental spectrometry system.

To understand this aspect well, FIG. 2 shows measurements done on an experimental spectrometry system, more precisely it temporally illustrates the pulses generated by two particles after shaping by the electronic circuit.

For a small temporal shift (the interaction moment $t_1$ of the first photon and the interaction moment $t_2$ of the other photon verify the inequality $|t_2-t_1| \leq T_{dead}$), only one interaction is detected, whereas for a temporal shift greater than about $T_{dead}$, two interactions are counted.

Moreover, when a single interaction is counted, the energy detected does not correspond to the energy deposited by one or the other of those photons, but rather to a different energy. The stack spectrum Emp(E) corresponds to an estimation of the portion of the measured spectrum $Sp_{mes}(E)$ resulting from stacks. It is obtained by quantifying the energy at which a single event, corresponding to two interactions in a stacking situation, is measured.

The estimation of this stack spectrum is done in two steps:
the stacking functions with two interactions corresponding to two photons are first modeled,
these functions are added up over all possible energy pairs $E_i$, $E_j$ with $1 \leq i \leq Nc$, and $i \leq j \leq Nc$ (or $1 \leq j \leq Nc$), Nc being the number of channels, to estimate the stack spectrum.

To first estimate the stacking functions corresponding to the interactions of two photons, consider a pair of photons with energies $(E_i, E_j)$.

A stacking function is the function that associates this pair with the energy measured as a function of the shift $\Delta t$ between the arrival moments of the two photons:

$$F_{E_i,E_j}: \Delta t \mapsto E$$

$$[0, T_{dead}] \to [\max(E_i, E_j), E_i+E_j]$$

In other words, the stacking function $F_{Ei,Ej}$ establishes a relationship between the temporal shift of two stacked interactions of energies Ei and Ej and the energy attributed to that stack.

Later, an example of modeling of this function will be provided, this being a decreasing function of the shift $\Delta t$.

For $\Delta t=0$, this function reaches its maximum value $E_i+E_j$.

It then involves a coincidence detection: the two photons having interacted are therefore indissociable and their energies add up.

The minimum value of this function is $\max(E_i, E_j)$. Indeed, the measured energy always remains greater than or equal to the maximum energy deposited by one of the two photons.

Figure 3:
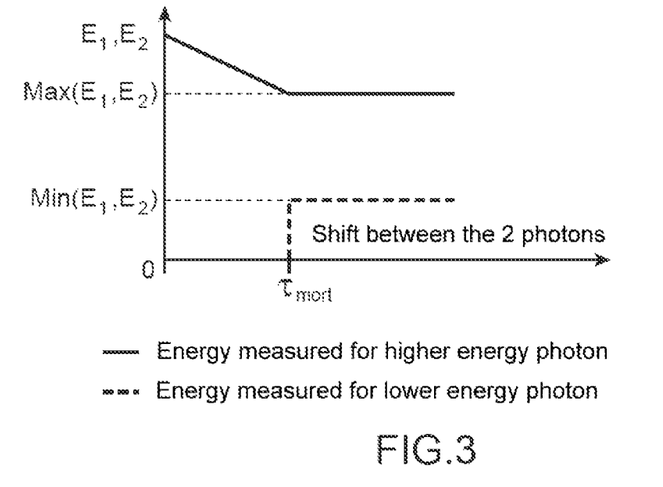
FIG. 3 shows a model of a stacking function with two photons.

This is illustrated in FIG. 3, where the top figure illustrates the energy measured for the higher energy photon max(E1, E2), and the bottom figure illustrates the energy measured for the lower energy photon min(E1, E2).

For a zero temporal shift (case of coincidence detection), the measurement is distorted because an event is measured at an energy equal to the sum of the energies of the photons (or $E_1+E_2=\max(E_1, E_2)+\min(E_1, E_2)$).

For a shift greater than or equal to the dead time, each of the two photons is indeed measured at its own energy (the higher energy one at Max(E1, E2) and the lower energy one at $\min(E_1, E_2)$).

For an intermediate temporal shift, an event is measured at a variable energy between $E_1+E_2$.

It is clear that this involves a continuous and decreasing function over the interval $[0, T_{dead}]$.

This function of the energy measured as a function of the temporal shift is therefore reversible. Its inverse, noted $F^{-1}$, makes it possible to associate, with an energy, between the maximum value $E_i+E_j$ and the minimum value $\max(E_i,E_j)$, a time interval:

$$F^{-1}_{E_i,E_j}: E \mapsto \Delta t$$

$$[\max(E_i,E_j), E_i+E_j] \to [0, T_{dead}]$$

The energy range being discretized, this inverse function $F^{-1}_{EiEj}(E_k)$ is determined as follows:
for $E_k$ included in the interval $[\max(E_i, E_j), E_i+E_j]$, $F^{-1}_{EiEj}(E_k)$ is the time shift $\Delta t$ between two interactions with energies $E_i$ and $E_j$, this shift resulting in a stacking at energy $E_k$,
for $E_k$ outside the interval $[\max(E_i, E_j), E_i+E_j]$: $F^{-1}_{EiEj}(E_k)=0$; no temporal shift can provide such an energy, since it is outside the possible values.

For example: $i \neq j$ and/or $i \neq k$ and/or $j \neq k$.

Given the meaning of the function F, given above, this inverse function $F^{-1}_{EiEj}(E_k)$ represents the temporal shift $\Delta t$ between two interactions of respective energies $E_i$ and $E_j$ such that these interactions are considered a single interaction with energy $E_k$.

This function $F^{-1}_{EiEj}$ can be chosen to be linear.

We can now proceed to calculate the elementary stack spectrum.

Let us calculate the spectrum generated by the stacks between the photons having deposited the energy $E_i$ and those having deposited the energy $E_j$.

For this, the energy interval $[\max(E_i,E_j), E_i+E_j]$ is discretized into energy channels $E_k$ each having the width of a channel of the spectrometric sensor, we therefore have $$\frac{E_i + E_j - \max(E_i, E_j)}{\Delta E}$$

channels, $\Delta E$ corresponding to the energy range corresponding to each channel, this range here being assumed to be identical for each of the Nc channels.

For each value of k, the time interval $\delta t_{i,j}(k)$ associated with the channel with energy $E_k$ is given by the equation:

$$\delta t_{i,j}(k) = F_{EiEj}^{-1}(E_{k+1}) - F_{EiEj}^{-1}(E_k)$$

Among the group of energy photons $E_j$, noted $Sp_0(E_j)$, the probability can be estimated that at least one of them is in the time interval between $F^{-1}_{EiEj}(E_k)$ and $F^{-1}_{EiEj}(E_{k+1})$ in relation to a photon with energy i:

$$P_{i,j}(k) = 1 - [1 - 2 \times \delta t_{i,j}(k)/T_{expo}]^{Sp_0(E_i) \times Sp_0(E_j)}$$

$P_{i,j}(k)$ is the contribution, at energy $E_k$ of the stacking function, of the photons with energy $E_i$ stacked with those of energy $E_j$. In other words, $P_{i,j}(k)$ represents, for each channel (k) corresponding to the energy $E_k$, the probability that an event counted in that channel corresponds to a stack of two interactions, separated in time by a duration shorter than $T_{dead}$, with respective energies $E_i$ and $E_j$. $P_{i,j}$ will be called stacking probability and there will be as many stacking probabilities $P_{i,j}$ as there are pairs (i,j), with $1 \le i \le Nc$ and $i \le j \le Nc$ The stack spectrum Emp is then estimated by adding up, for each channel k, stacking probabilities previously defined for each pair i and j. This can be done iteratively by a loop over all of the pairs ($E_i$, $E_j$).

If Nc denotes the number of energy channels of the spectrometric sensor, the resulting spectrum is the sum of $Nc^2/2 + Nc/2$ elementary stack spectrums:

$$Emp(k) = \sum_{i=1}^{Nc} \sum_{j=i}^{Nc} P_{i,j}(k)$$

In practice we are seeking to estimate the dead time $T_{dead}$ and the stacking function for two photons. For both of these, there are various ways to proceed.

The dead time $T_{dead}$ can first be obtained by:
  simulating the pulse forms, at the outlet of the analog electronics, after absorption of a particle by the semiconductor 2, then filtering and processing of the signal emitted by the analog electronics,
  then estimating the minimum duration separating two photons making it possible to separate them.

According to this first method, the influence of the digital processing of the pulses on the dead time is neglected.

Alternatively, we proceed experimentally, by analyzing the signal of the pulses.

According to a first experimental method:
  one first reads the output signal from the means 4, 6 (analog electronics), before digitization and construction of the spectrums,
  then one estimates the minimum duration separating two photons that makes it possible to separate them.

According to a second experimental method, one proceeds by spectrum analysis:
  one first estimates the measured counting rate as a function of the incident flow (number of photons/s): different spectrums are produced at different counting rates, by varying the intensity I of the radiation generator 20. The theoretical counting rate is calculated assuming that it is proportionate to I. The reference value is estimated for the lowest flow, for which one considers the stacking phenomenon to be negligible (typically a stacking probability for an incident photon less than 1%),
  one then chooses a model for the system, for example the paralyzable model $$f(n) = n e^{-n \times T_{dead}}$$

or the non-paralyzable model:

$$f(n) = \frac{n}{1 - n \times T_{dead}}$$

or any other function f(n) considered relevant by those skilled in the art.

Where n is the theoretical counting rate, i.e. the counting rate in the absence of stacks.

One can then proceed to calculate the dead time, by adjusting f(n) to the experimental counting rate data. Certain devices for processing pulses and forming a spectrum also make it possible to determine a dead time. This size may also be considered a dead time exploitable by the invention.

Figure 4:
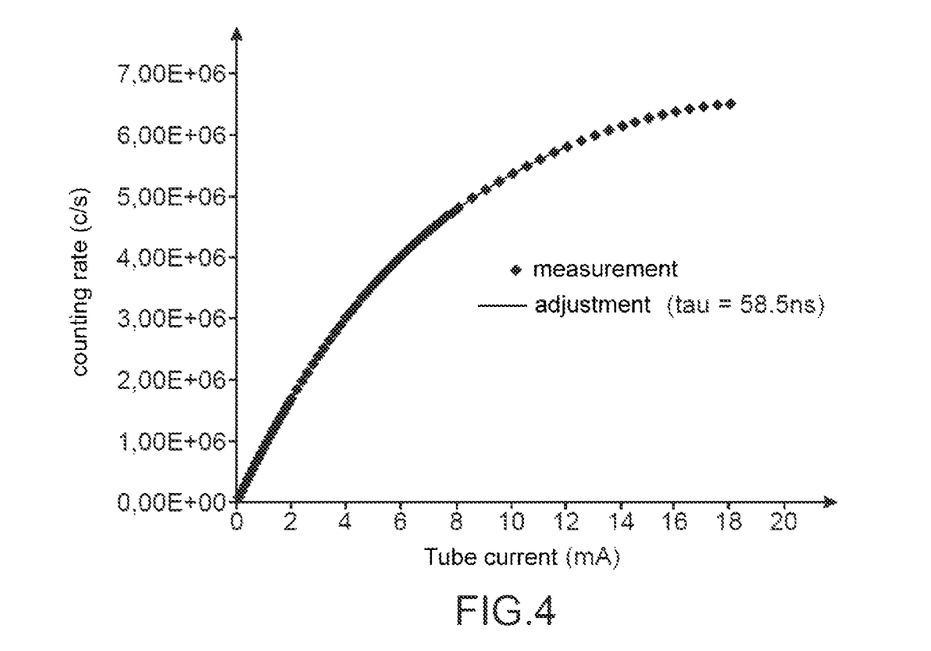
FIG. 4 shows a dead time measurement by adjusting the formula for the counting rate, for a paralyzable system, to experimental data.

FIG. 4 illustrates this principle, the adjustment then being done according to a paralyzable model, preferred by the inventors.

A set of counting measurements (represented by the dots) is done for different incident flow values, adjusted via the current I of the tube X (in mA). The counting rate formula for a paralyzable system is then adjusted on the experimental data by varying the system's dead time $T_{dead}$.

The adjustment then yields a dead time of 58 ns.

Regarding the stacking function, one can proceed with an estimation, by simulation, of the output pulse shapes emitted by the semiconductor 2 during absorption of a particle and filtering of said signal by the processing electronics. The stacking function is then estimated by simulating the system's response when it is subjected to two pulses corresponding to $E_i$ and $E_j$, and by varying the temporal deviation $\Delta t$ between those two pulses. The stacking function $F_{EiEj}(\Delta t)$ is then estimated corresponding to the energy E coming from the stack of two energy pulses $E_i$ and $E_j$ as a function of the temporal deviation $\Delta t$ separating those two interactions. The digital processing of the pulses can be neglected. In that case, this simulation makes it possible to estimate the shape of the analog signal, corresponding to the inlet of the block 8 of FIG. 1. Otherwise, one can proceed experimentally:
  by using a pulse generator at the inlet of the means 4 or 6 respectively constituting the preamplifier or the amplifier of the analog electronics;
  by measuring the energy $E_k$ produced by two generated pulses, corresponding to the energies $E_i$ and $E_j$, as a function of their temporal deviation $\Delta t$.

Lastly, another method is the so-called "affine model." Indeed, the measured energy decreasing with the shift $\Delta t$ between the detection moments of two interactions, the hypothesis can be made of a stacking function for two photons of the affine type, which linearly connects the measured energy and the temporal shift $\Delta t$.

The validity of this model was verified during an experimental study not described here $$F_{E_i,E_j}: \Delta t \mapsto \max(E_i,E_j) - \Delta t \times (E_i+E_j - \max(E_i,E_j))/T_{dead}$$

$$[0, T_{dead}] \to [\max(E_i,E_j), E_i+E_j]$$

The inverse of the stacking function for two photons, making it possible to associate an energy with a time interval separating the two photons and noted $F_{Ei,Ej}^{-1}$, is then deduced using the formula:

$$F_{E_i,E_j}^{-1}: E \mapsto \frac{E - \max(E_i, E_j)}{(E_i + E_j - \max(E_i, E_j))/T_{dead}}$$

$$[\max(E_i, E_j), E_i + E_j] \to [0, T_{dead}]$$

Thus, for E(k) such that $\max(E_i, E_j) \le E(k) \le Ei+Ej$, $F^{-1}_{EiEj}(E_k)$ corresponds to the temporal shift of the two interactions $E_i$ and $E_j$.

For an energy E(k) such that $E(k) < \max(Ei, Ej)$ or $E(k) > Ei+Ej$, $F^{-1}_{EiEj}$ is not defined.

Yet, we have seen, the time interval associated with the energy $E_k$ channel is given by the equation:

$$\delta t_{i,j}(k) = F_{EiEj}^{-1}(E_{k+1}) - F_{EiEj}^{-1}(E_k)$$

According to the hypothesis of an affine function F:

$$\delta t_{i,j}(k) = \frac{E_{k+1} - E_k}{(E_i + E_j - \max(E_i, E_j))/T_{dead}} \quad (1)$$

If the energy range $\Delta E_k$ for each channel k is constant and equal to $\Delta E$, $$\delta t_{i,j}(k) = \frac{\Delta E}{(E_i + E_j - \max(E_i, E_j))/T_{dead}}$$

and is therefore a constant for given i and j: in other words, according to this hypothesis, regardless of the value of k, $\delta t_{i,j}(k)$ only depends on i and j.

The function $\delta t_{i,j}(k)$ determines the size of the temporal deviation $\Delta t$ interval separating two interactions with energy $E_i$ and $E_j$, the stacking of which leads to a detected energy value $E_k$. When the temporal deviation $\Delta t$ between these two interactions is such that:

$$F^{-1}{}_{EiEj}(k) \leq \Delta t < F^{-1}{}_{EiEj}(k) + \delta t_{i,j}(k),$$

the stacking leading to a detected energy equal to $E_k$.

If the temporal deviation $\Delta t$ is not included in the interval defined by the preceding equation, for example if:

$$F^{-1}{}_{EiEj}(k) + \delta t_{i,j}(k) \leq \Delta t < F^{-1}{}_{EiEj}(k) + \delta t_{i,j}(k) + \delta t_{i,j}(k+1),$$

Which can be written:

$$F^{-1}{}_{EiEj}(k+1) \leq \Delta t < F^{-1}{}_{EiEj}(k+1) + \delta t_{i,j}(k+1),$$

then the stacking leads to a detected energy equal to $E_{k+1}$.

One therefore sees that there is an interval, with width $\delta t_{i,j}(k)$, defining the temporal deviations $\Delta t$, such that two interactions of energies $E_i$ and $E_j$ temporally separated by a difference $\Delta t$ included in that interval, are stacked and then considered to be a single interaction with energy $E_k$. One could also designate $\delta t_{i,j}(k)$ as the width of a window encompassing or including the temporal differences $\Delta t$, such that two interactions with energy $E_i$ and $E_j$ temporally spaced of such differences are considered to be stacked with energy $E_k$.

A correction method according to the invention, which uses the elements ($T_{dead}$, Emp, stacking function) will now be explained, in relation to FIG. 5.

This method makes it possible to deduce, from a spectrum measurement $Sp_{mes}$, degraded by the stacking phenomenon, a corrected spectrum $Sp_{cor}$.

But the incident spectrum $Sp_0$ is generally unknown, and it is then impossible to estimate the stacking probability $P_{mean}$, the stacking probabilities $P_{i,j}$ or the stack spectrum Emp according to the expressions previously described. Thus, correcting the stacks is based on an estimate of the mean stacking probability $P_{mean}$, stacking probabilities $P_{i,j}$ and the stack spectrum Emp, for example according to the expressions:

$$P_{mean} = 1 - (1 - P_0)^{N-1}$$

With $N = \sum_E Sp_{cor}(E)$ $$P_{i,j}(k) = 1 - [1 - 2 \times \delta t_{i,j}(k)/T_{expo}]^{Sp_{cor}(E_i) \times Sp_{cor}(E_j)}$$

And $Emp(k) = \sum_{i=1}^{Nc} \sum_{j=1}^{Nc} P_{i,j}(k)$

If the correction method is iterative, $Sp_{cor}$ will be considered as being established from the measured spectrum $Sp_{mes}$ during the first iteration; but, during subsequent iterations, a corrected spectrum $Sp_{cor(n)}$ will be established from the corrected spectrum $Sp_{cor(n-1)}$ obtained during the preceding iteration (assuming $1 \leq n \leq N_{it}$, where $N_{it}$ is the number of iterations). For example, the spectrum $Sp_{cor}$ can be equal to the spectrum $Sp_{mes}$ during the first iteration and, during successive iterations, $Sp_{cor}$ can be equal to the corrected spectrum during the preceding iteration.

If there is only one iteration, $Sp_{cor}$ is established from the measured spectrum $Sp_{mes}$, for example $Sp_{cor} = Sp_{mes}$.

This method includes 4 input variables:
the spectrum to be corrected $Sp_{mes}(j)$, which is in fact a column vector with dimension Number of channels $(N_C) \times 1$:

$$N_C \left\{ \begin{bmatrix} Spmes \end{bmatrix} \right.$$

Figure 1:
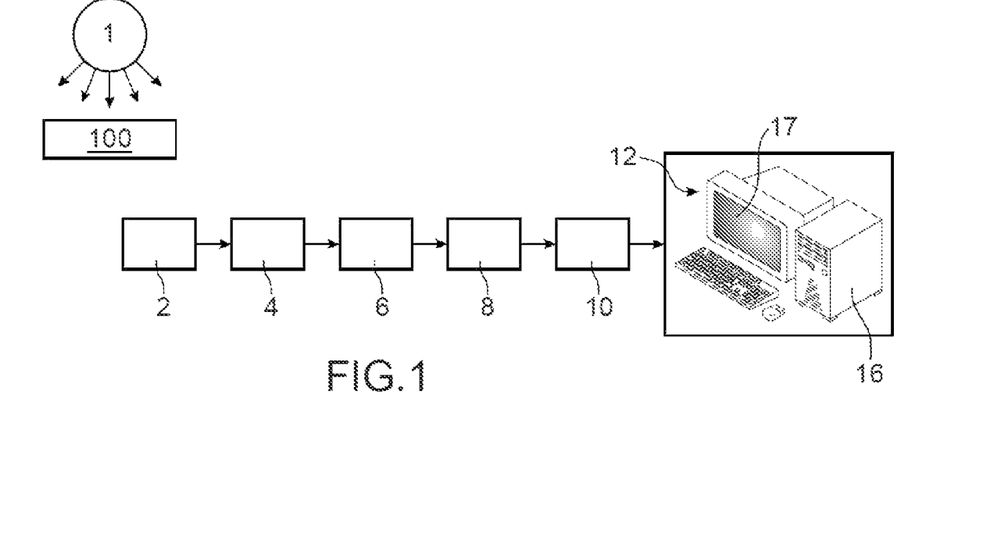
FIG. 1 shows a spectrometry device according to the invention.

A (digitized) spectrum was obtained by measuring, for example using the device of FIG. 1, and $Sp_{cor}$ can result from said spectrum.

The integration time $T_{expo}$. This is a real number given in ms, and it is a physical data of the system, as a function of the radiation source used.

The dead time of the sensor-electronics system $T_{dead}$. This is a real number given in ms. It has been explained how it can be measured or estimated.

The number of iterations to correct the stacks, therefore done iteratively, $N_{it}$. This number is for example chosen by an operator of the data processing system. It is possible for this number not to be predetermined. The method will then be stopped by the operator, or according to a convergence criterion, by comparing two spectrums corrected during two successive iterations.

In output, this method provides a corrected stack spectrum, $Sp_{cor(Nit)}$, also a vector with dimension $N_C \times 1$:

$$N_C \left\{ \begin{bmatrix} Sp_{cor(Nit)} \end{bmatrix} \right.$$

This method first includes (step S1) an initialization of the corrected spectrum from the measured spectrum, for example $Sp_{cor(0)} = Sp_{mes}$. In other words, during the initialization, the measured spectrum is identified at the corrected spectrum.

According to one embodiment, an iterative correction is then done $N_{it}$ times.

Upon each iteration, the following steps are carried out:
calculation of the mean stacking probability (function $f_0$) (step S2),
estimate of the stack spectrum (function $f_1$) (step S3),
correction of the stacks (function $f_2$) (step S4) to provide a corrected spectrum $Sp_{cor}$.

Step S2 makes it possible, from 3 input parameters: $Sp_{cor(n-1)}$ (which is a vector, initialized as indicated above for n=1); $T_{dead}$ (real number); $T_{expo}$ (real number), to provide a real number $P_{mean}$, using a one-step calculation:

$$P_{mean} = 1 - \left(1 - 2 \times \frac{T_{dead}}{T_{expo}}\right)^{\sum_{j=1}^{N_C} Sp_{cor(n-1)}(j)}$$

Or, more rigorously, $$P_{mean} = 1 - \left(1 - 2 \times \frac{T_{dead}}{T_{expo}}\right)^{\sum_{j=1}^{N_C} Sp_{cor(n-1)}(j) - 1}$$

From the two parameters $Sp_{cor(n-1)}$ (vector) and stacking function $P_{i,j}$, determined using the temporal differences interval width functions $\delta t_{ij}$ previously defined, step S3 makes it possible to provide an output: Emp (which is a vector), by a calculation also done in one step:

$$Emp(k) = \sum_{i=1}^{N_c} \sum_{j=i}^{N_c} P_{i,j}(k)$$

With:

$$P_{i,j}(k) = 1 - [1 - 2 \times \delta t_{i,j}(k) / T_{expo}]^{Sp_{cor(n-1)}(E_i) \times Sp_{cor(n-1)}(E_j)}$$

$Sp_{cor(n-1)}$ has already been defined above and $\delta_{i,j}(k)$ is the function that was previously presented, and which can be calculated according to one of the methods already explained, and preferably by equation (1).

The correction of the stacks (step S4) is done from the vector $Sp_{mes}$ (or $S_{pcor(n-1)}$ if there has been more than one iteration) of the real number P and the vector Emp determined in S3. It results in an output $Sp_{cor(n)}$. The calculation is done in one step:

$$Sp_{cor(n)} = \frac{Sp_{cor(n-1)} - Emp}{1 - P_{mean}}$$

Step S4 therefore makes it possible to subtract the stack spectrum from the measured spectrum.

It can include a division by a factor depending on the mean stacking probability $P_{mean}$ of the corrected spectrum $Sp_{cor}$, this factor can be equal to $1-P_{mean}$. If this division has not been done, the shape of the spectrum will be kept, but the integral will not be correct.

If $N_{it}$ iterations have been done, the method stops and the last spectrum $Sp_{cor(Nit)}$ obtained is considered to be the desired corrected spectrum. Otherwise, the process is restarted using the last obtained spectrum $Sp_{cor(n-1)}$ as the starting point.

Upon each iteration, the calculations are done, in particular of $P_{i,j}(k)$ and $Emp(k)$, as a function of the corrected spectrum obtained during the preceding iteration (except the first iteration where $P_{i,j}(k)$ and $Emp(k)$ are calculated as a function of the measured spectrum, which is then considered the corrected spectrum).

The higher the number $N_{it}$, the more precise the result. According to the experimental results obtained, this number is between 1 and 100, preferably between 2 and 10.

The process of estimating the stacking function is based on the hypothesis that the stacks with two photons are mostly compared to the stacks with three or more photons.

This hypothesis is justified particularly for low flows (low stacking rate).

For an incident photon, the probability of stacking with one and only one photon can be written:

$$P_2 = P_0 \times (1-P_0)^n \times n$$

Let us recall that the stacking probability can be written:

$$P = 1 - (1-P_0)^{N-1}$$

Consider the example of a system coupling a photon sensor followed by processing electronics whereof the global dead time, i.e. the minimum time interval separating 2 photons absorbed in the sensor to measure them, is 62 ns.

Figure 6:
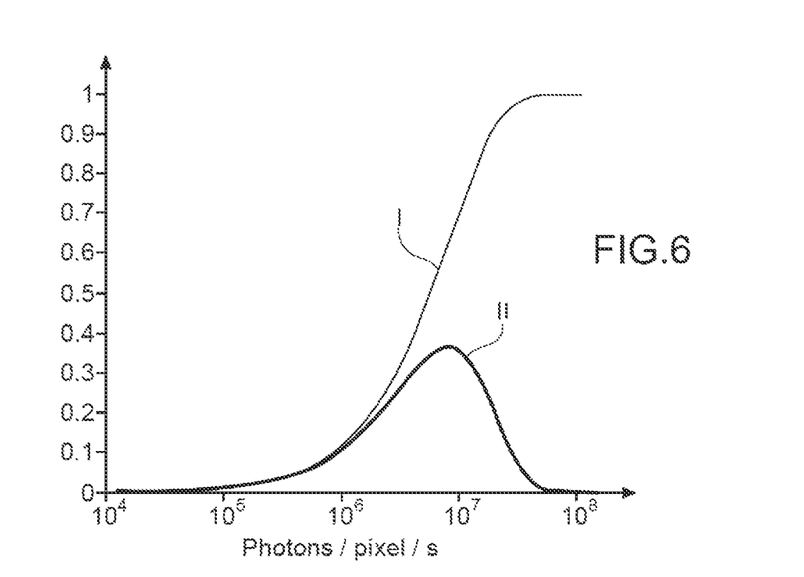
FIG. 6 shows simulated stacking probability curves for a dead time of 62 ns.

FIG. 6 illustrates the variations of P and $P_2$, defined above, as a function of the incident flow, expressed in number of photons per pixel and per second.

The probability of stacking with two photons (curve II) is an increasing function of the flow for the low values thereof.

It then reaches a maximum before tending towards 0 for very significant flows, greater than $5 \times 10^7$ photons/pixel/s. The stacking probability P (curve I) is, however, an increasing function of the flow.

In the high flow zone, this stacking probability tends toward 1 and the group of stacks, are stacks with more than two photons.

Figure 7:
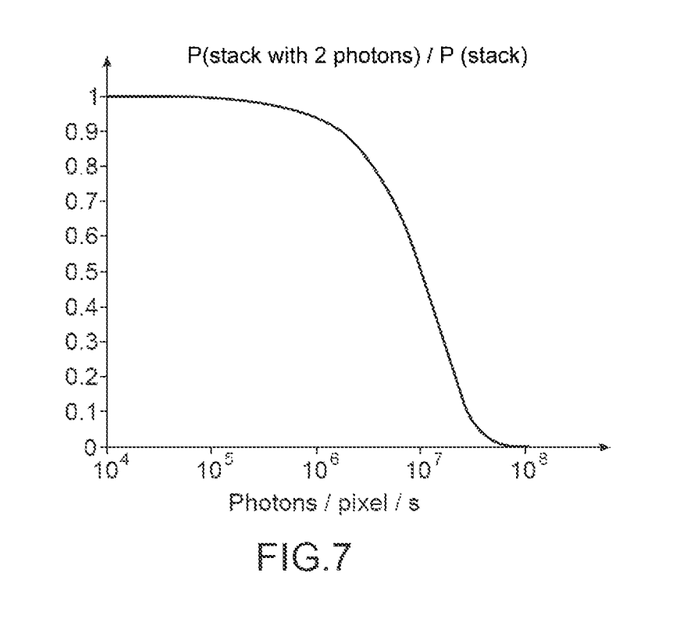
FIG. 7 shows a ratio curve of the stacking probability of two photons over the total stacking probability, for a dead time of 62 ns.

FIG. 7 shows the ratio of the probability of stacking with two photons over the total stacking probability.

This curve shows that the hypothesis is accurate to within 3% in the range $[0-5 \times 10^5$ photons/pixel/s$]$. It remains true to within 7% for a flow of $1 \times 10^6$ photons/pixel/s.

One can see that the range of flows over which the two-photon stacking hypothesis is accurate is broader as the system dead time is lower.

Figure 8A:
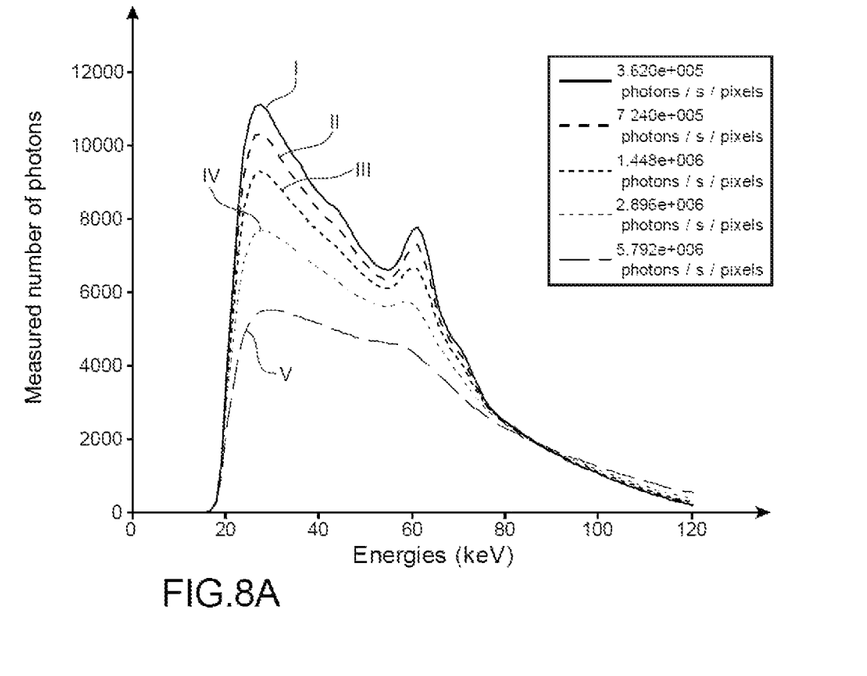
FIGS. 8A and 8B are spectrum measurements at different flows, before and after correction according to the invention, respectively.
Figure 8B:
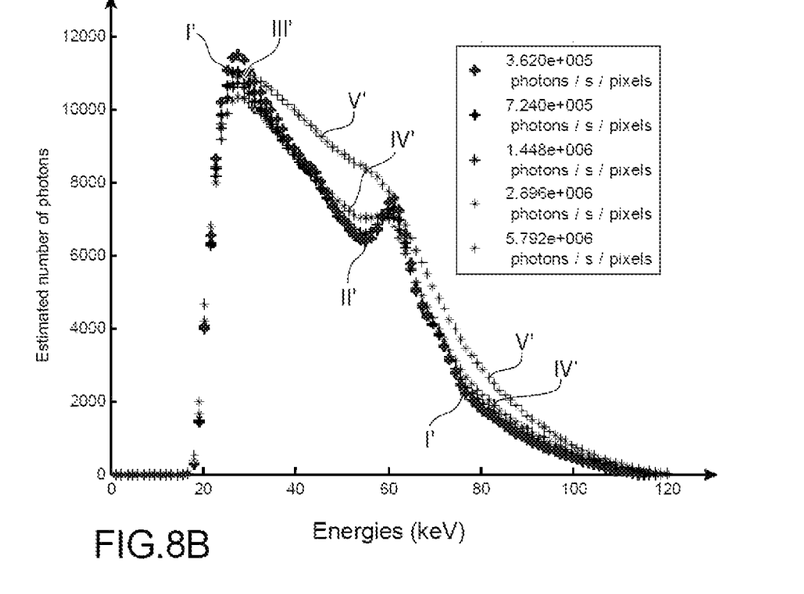

FIGS. 8A-8B illustrate the performance of the method for correcting stacks according to the invention, in rapid spectrometry.

FIG. 8A shows the spectrums measured for different photon flows:
curve I: $3.6 \times 10^5$ photons/s/pixel;
curve II: $7.2 \times 10^5$ photons/s/pixel;
curve III: $1.4 \times 10^6$ photons/s/pixel;
curve IV: $2.0 \times 10^6$ photons/s/pixel;
curve V: $5.8 \times 10^6$ photons/s/pixel;

FIG. 8B shows the same spectrums after correction (the spectrum I' being the corrected spectrum of spectrum I, etc.) in 3 iterations.

These figures show good correction up to about $3 \times 10^6$ photons/s/pixel and a degradation of the corrected spectrum acquired with a flow of about $6 \times 10^6$ photons/s/pixel, although the result still remains acceptable.

The complete calibration is relatively simple.

It can be done through a series of full flow measurements for different intensities of the X-ray generator.

In the particular embodiment of the invention described above, the determination of the two-photon stacking functions does not require additional calibration; it can be based on a model based solely on knowledge of the dead time.

The invention therefore proposes a rapid correction method that has the interest of having as input only the data for the spectrum $Sp_{mes}$ as well as the data for $T_{expo}$ and $T_{dead}$.

This therefore makes it possible to reduce the amount of information to be transmitted to the means performing the data processing.

The invention claimed is:

1. A method for correcting a measured spectrum of X radiation according to a number of channels Nc, each channel i corresponding to an energy range between $E_i$ and $E_i+\Delta E_i$, comprising:
   determining, using processing circuitry, a function $\delta t_{i,j}(k)$, which defines a size of a temporal deviation $\Delta t$ interval, such that two interactions with energy $E_i$ and $E_j$ temporally separated by $\Delta t$ are stacked and considered to have a detected energy value $E_k$;
   determining, using the processing circuitry, from the function $\delta t_{i,j}(k)$, a probability function $P_{i,j}(k)$ that an event counted in a channel k corresponds to a stack of two interactions, respectively, of energies $E_i$ and $E_j$;
   calculating, using the processing circuitry, from the probability function $P_{i,j}(k)$, a stack spectrum, which is a part of the measured spectrum that corresponds only to the stack; and
   adjusting, using the processing circuitry, the measured spectrum based on a difference between the measured spectrum and the calculated stack spectrum thus forming at least a first corrected spectrum accounting for perturbations present in the measured spectrum due to a stacking phenomenon.

2. The method according to claim 1, the stack spectrum being calculated from the measured spectrum, exposure time, dead time data, and a minimum duration, separating two photons, below which there is stacking of the two photons and only one of the two photons is detected.

3. The method according to claim 2, the dead time being determined by simulation or experimentally.

4. The method according to claim 1, further comprising iteratively calculating $N_{it}$ ($N_{it} \geq 1$) corrected spectrums, each iteration calculating a corrected spectrum of order (n) from a corrected spectrum of order (n−1) or from the measured spectrum if there is no preceding corrected spectrum of order (n−1), by calculating a difference between the corrected spectrum of order (n−1), or the measured spectrum, and the stack spectrum, wherein $1 \leq n \leq N_{it}$, n is an integer, and $N_{it}$ corresponds to a number of iterations of said calculating.

5. The method according to claim 4, further comprising, iterated $N_{it}$ times, with $N_{it} \geq 1$:
   calculating, using processing circuitry, a mean stacking probability, as a function of a preceding corrected spectrum $Sp_{cor(n-1)}$, or of the measured spectrum if there is no preceding corrected spectrum, and exposure time and dead time data;
   estimating, using processing circuitry, the stack spectrum, as a function of the preceding corrected spectrum, or of the measured spectrum if there is no preceding corrected spectrum, and the exposure time; and
   calculating, using processing circuitry, the corrected spectrum, using the difference between a preceding corrected spectrum or the measured spectrum, and the estimated stack spectrum.

6. The method according to claim 5, the mean stacking probability being calculated using formula:

$$P_{mean} = 1 - \left(1 - 2 \times \frac{T_{dead}}{T_{expo}}\right)^{\sum_{j=1}^{Nmax} Sp_{cor(n-1)}(j)}$$

where $Sp_{cor(n-1)}(j)$ is the value, for the channel j, of the preceding corrected spectrum $SP_{cor(n-1)}$, or of the measured spectrum if there is no preceding corrected spectrum.

7. The method according to claim 1, the stack spectrum being calculated using formula:

$$Emp(k) = \sum_{i=1}^{Nc} \sum_{j=i}^{Nc} P_{i,j}(k).$$

8. The method according to claim 7, wherein:

$$P_{i,j}(k) = 1 - [1 - 2 \times \delta t_{i,j}(k)/T_{expo}]^{Sp_{cor(n-1)}(E_i) \times Sp_{cor(n-1)}(E_j)}$$

$Sp_{cor(n-1)}(j)$ being the value, for the channel j, of the preceding corrected spectrum $Sp_{cor(n-1)}$, or of the measured spectrum if there is no preceding corrected spectrum.

9. The method according to claim 1, $\delta t_{i,j}(k)$ being determined from an inverse function of a stacking function $F_{Ei,Ej}(\Delta t)$, the stacking function establishing a relationship between a temporal shift of two stacked interactions of energies $E_i$ and $E_j$ and the energy attributed to that stack.

10. The method according to claim 9, further comprising estimating the function $F_{Ei,Ej}(\Delta t)$ by simulation or experimentally, or by a decreasing affine function of the energies $E_i$ and $E_j$.

11. The method according to claim 1, the corrected spectrum being divided by a factor depending on a mean probability of the corrected spectrum, the mean probability being a stacking probability of an incident photon with at least one other photon.

12. A device for correcting a measured X radiation spectrum, comprising a number of channels Nc, each channel i corresponding to an energy range between $E_i$ and $E_i+\Delta E_i$, comprising:
   at least one processing circuit configured to:
   determine a function $\delta t_{i,j}(k)$, which defines a size of a temporal deviation $\Delta t$ interval, such that two interactions with energy $E_i$ and $E_j$ temporally separated by $\Delta t$ are stacked and considered to have a detected energy value $E_k$;
   determine, from the function $\delta t_{i,j}(k)$, a probability function $P_{i,j}(k)$ that an event counted in a channel k corresponds to a stack of two interactions, respectively, of energies $E_i$ and $E_j$;
   calculate, from the probability function $P_{i,j}(k)$, a stack spectrum, which is a part of the measured spectrum that corresponds only to the stack; and
   adjust, using the processing circuitry, the measured spectrum based on a difference between the measured spectrum and the calculated stack spectrum thus forming at least a first corrected spectrum accounting for perturbations present in the measured spectrum due to a stacking phenomenon.

13. The device according to claim 12, the at least one processing circuit comprising at least one processor.

14. The device according to claim 12, the stack spectrum being calculated from the measured spectrum, exposure time, dead time data, and a minimum duration, separating two photons, below which there is stacking of the two photons and only one of the two photons is detected.

15. The device according to claim 14, wherein the at least one processing circuit is further configured to determine the dead time by simulation.

16. The device according to claim 12, wherein the at least one processing circuit is further configured to iteratively calculate $N_{it}$ ($N_{it} \geq 1$) corrected spectrums, each iterative calculation being of a corrected spectrum of order (n) from a corrected spectrum of order (n−1) or from the measured spectrum if there is no preceding corrected spectrum of order (n−1), to use a calculated difference between the corrected spectrum of order (n−1), or the measured spectrum, and the stack spectrum, wherein $1 \leq n \leq N_{it}$, n is an integer, and $N_{it}$ corresponds to a number of iterations of the calculation.

17. The device according to claim 16, wherein the at least one processing circuit is further configured to carry out the following steps, iterated $N_{it}$ times, with $N_{it} \geq 1$:
calculate a mean stacking probability, as a function of a preceding corrected spectrum $Sp_{cor(n-1)}$, or of the measured spectrum if there is no preceding corrected spectrum, and exposure time and dead time data;
estimate the stack spectrum, as a function of the preceding corrected spectrum, or of the measured spectrum if there is no preceding corrected spectrum, and the exposure time; and
calculate the corrected spectrum, using the difference between a preceding corrected spectrum or the measured spectrum, and the estimated stack spectrum.

18. The device according to claim 17, wherein the at least one processing circuit is further configured to calculate the mean stacking probability using formula:

$$P_{mean} = 1 - \left(1 - 2 \times \frac{T_{dead}}{T_{expo}}\right)^{\sum_{j=1}^{Nc} Sp_{cor(n-1)}(j)}$$

where $SP_{cor(n-1)}(j)$ is the value, for the channel j, of the preceding corrected spectrum $SP_{cor(n-1)}$, or of the measured spectrum if there is no preceding corrected spectrum.

19. The device according to claim 12, wherein the at least one processing circuit is further configured to calculate the stack spectrum using formula:

$$Emp(k) = \sum_{i=1}^{Nc} \sum_{j=i}^{Nc} P_{i,j}(k).$$

20. The device according to claim 19, wherein the at least one processing circuit is further configured to calculate the stack spectrum using the formula:

$$Emp(k) = \sum_{i=1}^{Nc} \sum_{j=i}^{Nc} P_{i,j}(k)$$

with:

$$P_{i,j}(k) = 1 - [1 - 2 \times \delta t_{i,j}(k) / T_{expo}]^{Sp_{cor(n-1)}(E_i) \times Sp_{cor(n-1)}(E_j)}$$

where $Sp_{cor(n-1)}(j)$ is the value, for the channel j, of the preceding corrected spectrum $SP_{cor(n-1)}$, or of the measured spectrum if there is no preceding corrected spectrum.

21. The device according to claim 12, the function $\delta t_{i,j}(k)$ being determined from an inverse function of a stacking function $F_{Ei,Ej}(\Delta t)$, the stacking function associating a pair of photons with respective energies ($E_i$, $E_j$) with the energy measured as a function of a shift $\Delta t$ between respective arrival moments of the pair of photons, such that:

$$\delta t_{i,j}(k) = F_{EiEj}^{-1}(E_{k+1}) - F_{EiEj}^{-1}(E_k).$$

22. The device according to claim 21, wherein the at least one processing circuit is further configured to estimate the function $F_{Ei,Ej}(\Delta t)$ by simulation, the function $F_{Ei,Ej}(\Delta t)$ being estimated by a decreasing affine function of the energies $E_i$ and $E_j$.

23. A spectrometry device, comprising:
a radiation sensor;
an electronic processor configured to process signals coming from the sensor and to form a spectrum of a radiation having interacted with the sensor; and
a device for correcting a measured X radiation spectrum, comprising a number of channels Nc, each channel i corresponding to an energy range between $E_i$ and $E_i + \Delta E_i$, comprising at least one processing circuit configured to:
determine a function $\delta t_{i,j}(k)$, which defines a size of a temporal deviation $\Delta t$ interval, such that two interactions with energy $E_i$ and $E_j$ temporally separated by $\Delta t$ are stacked and considered to have a detected energy value $E_k$;
determine, from the function $\delta t_{i,j}(k)$, a probability function $P_{i,j}(k)$ that an event counted in a channel k corresponds to a stack of two interactions, respectively, of energies $E_i$ and $E_j$;
calculate, from the probability function $P_{i,j}(k)$, a stack spectrum, which is a part of the measured spectrum that corresponds only to the stack; and
adjust, using the processing circuitry, the measured spectrum based on a difference between the measured spectrum and the calculated stack spectrum thus forming at least a first corrected spectrum accounting for perturbations present in the measured spectrum due to a stacking phenomenon.

* * * * *